(12) United States Patent
Shirokoshi

(10) Patent No.: US 6,290,625 B1
(45) Date of Patent: Sep. 18, 2001

(54) SMALL BACKLASH PLANETARY GEAR ASSEMBLY

(75) Inventor: Norio Shirokoshi, Hotaka-machi (JP)

(73) Assignee: Harmonic Drive Systems, Inc. (JP)

( * ) Notice: Subject to any disclaimer, the term of this patent is extended or adjusted under 35 U.S.C. 154(b) by 0 days.

(21) Appl. No.: 09/467,690

(22) Filed: Dec. 21, 1999

(30) Foreign Application Priority Data

Dec. 21, 1998 (JP) .................................................. 10-362155

(51) Int. Cl.⁷ .............................. F16H 57/08; F16H 57/12
(52) U.S. Cl. ................................................................. 475/347
(58) Field of Search ................................... 475/331, 346, 475/347; 74/409

(56) References Cited

U.S. PATENT DOCUMENTS

| | | | | |
|---|---|---|---|---|
| 2,543,811 | * | 3/1951 | Snow et al. ............................ | 475/346 |
| 2,893,268 | * | 7/1959 | Liebel .................................... | 475/346 |
| 3,401,580 | * | 9/1968 | Sigg ....................................... | 475/347 |
| 3,908,501 | * | 9/1975 | Aizawa ................................... | 83/788 |
| 4,096,769 | * | 6/1978 | Horikiri et al. ........................ | 475/347 |
| 4,848,172 | * | 7/1989 | Morishita .............................. | 475/347 |
| 5,295,925 | * | 3/1994 | Hirabayashi ........................... | 475/331 |

* cited by examiner

*Primary Examiner*—Charles A. Marmor
*Assistant Examiner*—Ankur Parekh
(74) *Attorney, Agent, or Firm*—Rosenthal & Osha L.L.P.

(57) ABSTRACT

A small backlash planetary gear assembly can achieve a large torque capacity while minimizing backlash. The small backlash planetary gear assembly has an assembly housing, an internal gear, a sun gear arranged inside of the internal gear in concentric fashion, a plurality of planet gears meshing with the internal gear and the sun gear, and a carrier rotatably supporting the planet gears. The internal gear includes an annular boss fixed to said assembly housing, a thin wall annular body portion extending from one axial end of the boss in cantilever fashion and internal gear teeth formed on the inner peripheral surface of the annular body portion so that the thin wall annular body portion may absorb tolerance in assembling and tolerance in gear machining in respective components by resilient deformation.

1 Claim, 1 Drawing Sheet

SMALL BACKLASH PLANETARY GEAR ASSEMBLY

BACKGROUND OF THE INVENTION

1. Field of the Invention

The present invention relates generally to a planetary gear assembly. More particularly, the invention relates to a small backlash planetary gear assembly which has high torque capacity with reduced backlash.

2. Description of the Related Art

A small backlash planetary gear assembly is desirable so as to reduce a gap at a meshing portion of gears and at a bearing portion of a planet gear. It is difficult to maintain equal load distribution on respective planet gears and smooth rotation thereof. Also, a reduced gap may produce adverse effects when correcting for displacement of a sun gear in a direction parallel to a sun gear axis. Accordingly, maintaining equal load distribution to respective planet gears, correcting for angular transmission error, and correcting for displacement of a sun gear in the direction parallel to the sun gear axis are typical design considerations of the small backlash planetary gear assembly.

Small backlash planetary gear assemblies typically include internal gears having pitch circle diameters of approximately 60 mm. This size of gear exhibits small deflections when examining a relationship between a rated load and flexural spring rigidity. Therefore, it is difficult to absorb the influence of tolerance buildup in the gear machining and during assembly with respect to the typical characteristics set forth above and in view of the resiliency of respective elements.

In the small backlash planetary gear assembly, tolerance in gear machining and tolerance in assembling inherently influences various characteristics of the final products. A mechanism for adjusting fluctuation of backlash due to such tolerance in gear machining and tolerance in assembling has been proposed in commonly owned Japanese Unexamined Utility Model Publication No. Heisei 4-44545.

A backlash adjusting mechanism disclosed in the above-identified publication is designed to divide a carrier supporting four planet gears into halves along an axial direction for supporting respective two planet gears on divided carrier segments, and for relatively twisting respective carrier segments for adjusting the backlash between the gears.

With this backlash adjusting mechanism, two out of four planet gears may be meshed with the internal gear and the sun gear in a backlash free condition to successfully reduce lost motion.

However, in the backlash adjusting mechanism set forth above, only two out of four planet gears may contribute for torque transmission, thereby reducing torque capacity.

SUMMARY OF THE INVENTION

It is an object of the present invention to provide a small backlash planetary gear assembly which can achieve large torque capacity while minimizing backlash.

In order to accomplish the above-mentioned object, a small backlash planetary gear assembly, according to the present invention, comprises:

an assembly housing;
an internal gear;
a sun gear arranged inside of the internal gear in concentric fashion;
a plurality of planet gears meshing with the internal gear and the sun gear;
a carrier rotatably supporting the planet gears; and
the internal gear including an annular boss fixed to said assembly housing, a thin wall annular body portion extending from one axial end of the boss in cantilever fashion and internal gear teeth formed on the inner peripheral surface of the annular body portion,
whereby the thin wall annular body portion absorbs tolerance in assembling and tolerance in gear machining in respective components through by resilient deformation.

In the construction set forth above, it is preferred that the carrier is rotatably supported on an inner peripheral surface of the assembly housing via a cross roller bearing. In this manner, support of the carrier can be increased.

Also, by assembling the sun gear in a floating condition, movement of the sun gear in a direction parallel to an axis of the sun gear is facilitated to effectively absorb tolerance in gear machining and tolerance in assembly of respective components.

BRIEF DESCRIPTION OF THE DRAWINGS

The present invention will be understood more fully from the detailed description given hereinafter and from the accompanying drawings of the preferred embodiment of the present invention which, however, should not be taken to be limiting. The detailed description and drawings are for explanation and understanding only.

In the drawings.

DESCRIPTION OF THE PREFERRED EMBODIMENT

Figures 1A, 1B:
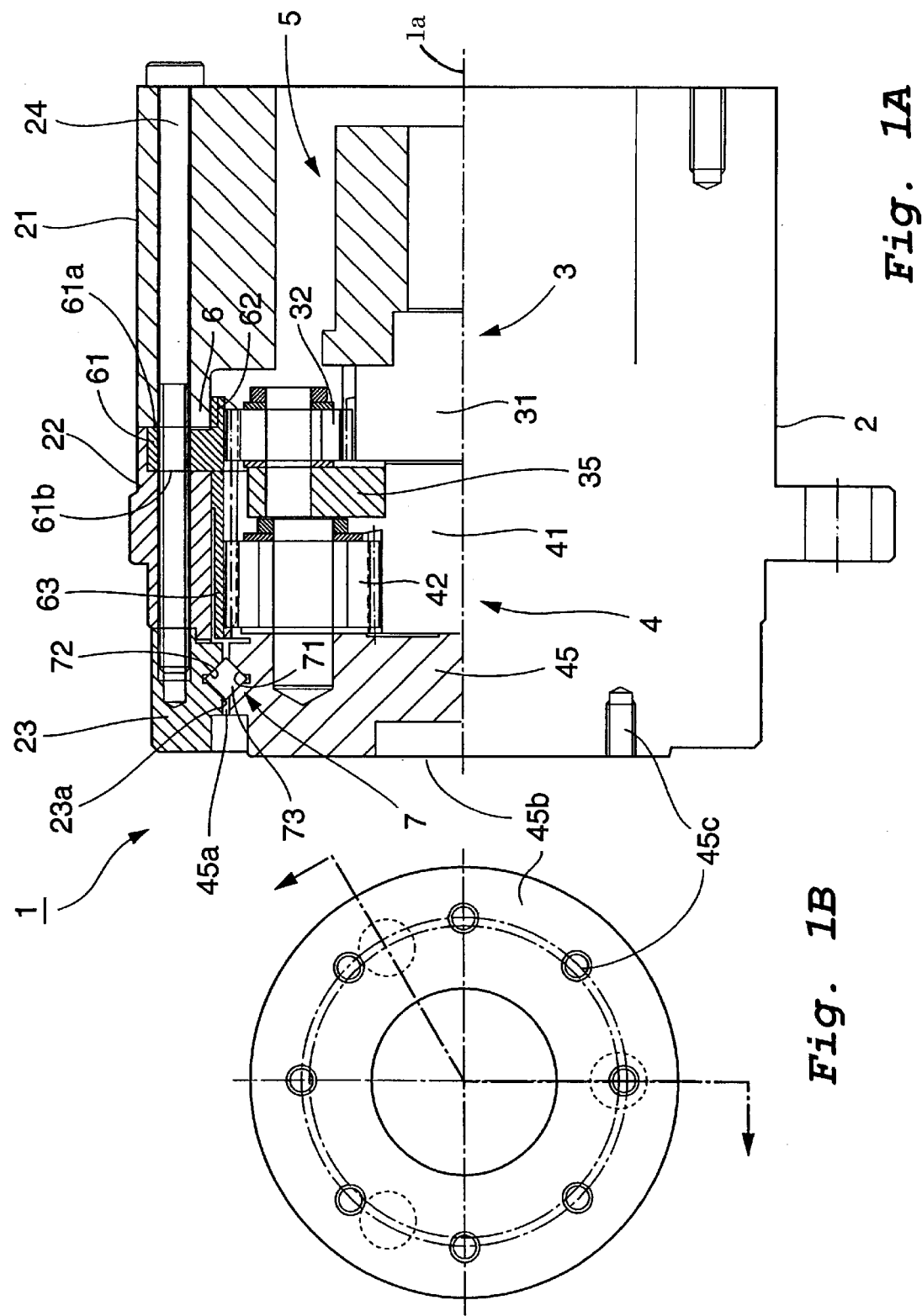
FIG. 1A is a half section of the preferred embodiment of a small backlash planetary gear assembly according to the present invention.
FIG. 1B is an explanatory illustration showing an end face of the preferred embodiment of the small backlash planetary gear assembly on an output side together with a section line identifying the cut position of the half section of FIG. 1A.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to simplify the description of the present invention.

The small backlash planetary gear assembly 1 is a two-stage epicycle reduction gear unit including a front stage planetary gear mechanism 3 and a rear stage planetary gear mechanism 4 assembled within a cylindrical assembly housing 2. The cylindrical assembly housing 2 is formed with cylindrical members 21, 22, and 23 aligned in a direction of an axis 1a and fixed with respect to each other by means of fastening bolts 24. A coupling mechanism 5 for connecting a high speed rotary shaft (not shown) of a high speed rotational output source, such as a motor or the like, to the front stage planetary gear mechanism 3, is assembled within and located at the input side of the cylindrical member 21.

The front stage planetary gear mechanism 3 includes a sun gear 31, three planet gears 32, 33, and 34 (only one planet gear 32 is shown in the drawing) arranged in circumferential alignment in a concentric relationship with the sun gear 31 and in positions surrounding the sun gear 31 and meshing therewith. A resiliently deformable thin wall cylindrical internal gear 6 surrounds the planet gears 32 to 34 and meshes therewith, and a carrier 35 rotatably supports the planet gears 32 to 34.

The rear stage planetary gear mechanism 4 includes a sun gear 41, on one end of which the carrier 35 of the front stage planetary gear mechanism 3 is fixed in coaxial fashion, three planet gears 42 to 44 (only one planet gear 42 is shown in the drawing) arranged in circumferential alignment in a concentric relationship with the sun gear and in positions surrounding the sun gear 41 and meshing therewith. The resiliently deformable thin wall cylindrical internal gear 6 common with the front stage planetary gear mechanism 3 as set forth above surrounds the planet gears 42 to 44 and meshes therewith, and a carrier 45 rotatably supports the planet gears 42 to 44.

The resiliently deformable thin wall cylindrical internal gear 6 is constructed with an annular boss 61 and annular body portions 62 and 63 integrally formed with the annular boss 61 and axially extending from both sides from inner peripheral edges of left and right annular end faces 61a and 61b of the annular boss 61. On an inner peripheral surface of the internal gear 6, internal gear teeth are formed over the entire length. Among these internal gear teeth, internal gear teeth formed on the inner peripheral surfaces of the cylindrical body portion 62 and the boss 61 serve as the internal gear on the front stage side, and the internal gear teeth located in the vicinity of the tip end of the annular body portion 63 serve as the internal gear on the rear stage side.

Here, the annular body portion 63 including the internal gear teeth serving as the internal gear for the rear stage is thinner than the boss 61 and extends from the inner peripheral edge of the annular end face 61b of the boss in cantilever fashion. A small gap is defined between the annular body portion 63 and the cylindrical member 22 of the cylindrical assembly housing 2 except for the region where the annular body portion 63 is joined with the boss 61.

The boss 61 is disposed between the cylindrical members 21 and 22 and is fixed therebetween by means of the fastening bolts 24. Therefore, the tip end portion of the annular body portion 63 extending from the boss 61 in cantilever fashion is permitted to resiliently deform by a given magnitude in a radial direction.

The carrier 45 on the rear stage side defines an end face on the output side. A cross roller bearing 7 is positioned between an outer peripheral surface 45a and an inner peripheral surface 23a of the cylindrical member 23 of the cylindrical assembly housing 2. The carrier 45 is rotatably supported with respect to the inner peripheral surface 23a of the cylindrical assembly housing 2 by the cross roller bearing 7.

A portion of the carrier 45 on the side of the outer peripheral surface 45a serves as an inner ring of the cross roller bearing 7. On the outer peripheral surface 45a of the carrier 45, cross-sectionally triangular track groove 71 is formed. Similarly, a portion on the inner peripheral surface 23a of the cylindrical member 23 of the cylindrical assembly housing 2 serves as an outer ring of the cross roller bearing 7. A cross-sectionally triangular track groove 72 is also formed on the inner peripheral surface 23a of the cylindrical member 23. Within an annular track of square cross-section of the cross roller bearing 7 defined by the track grooves 71 and 72, rollers 73 are loaded one by one along the circumferential direction.

It should be noted that, on the outer end face 45b of the carrier 45, a plurality of (five in the shown embodiment) threaded holes 45c for mounting the load side member are formed in circumferential alignment concentric with the carrier 45.

In the small backlash planetary gear assembly 1, the sun gears 31 and 41 in the front stage and rear stage are assembled in a floating condition. Specifically, the sun gear 31 in the front stage is not supported by a bearing or the like except that one end thereof is connected to the coupling mechanism 5 and is only meshed with the planet gears 32 to 34. Accordingly, the sun gear 31 may displace in the direction parallel to the sun gear 31 axis (e.g., in a direction parallel to axis 1a). Similarly, the sun gear 41 in the rear stage is not supported by a bearing or the like except that one end thereof is connected to the carrier 35 of the front stage and is only meshed with the planet gears 42 to 44. Thus, the sun gear 41 may be displaced in the direction parallel to the sun gear 41 axis (e.g., in a direction parallel to axis 1a).

In the embodiment of the planetary gear assembly 1 constructed as set forth above, even if tolerance buildup in the gear machining and tolerance buildup in assembling is present, such buildup error may be absorbed by resilient deformation of the thin annular body portion 63 of the resiliently deformable thin wall cylindrical internal gear 8 to establish appropriate meshing of the respective gears. Thus, a load can be equally distributed to respective planet gears. Further, because the sun gears 31 and 41 are assembled in the floating condition, appropriate meshing of respective gears can also be established even if the sun gears are displaced in the direction parallel to the respective sun gear axes.

Accordingly, in the embodiment of the planetary gear assembly 1, it becomes possible to reduce unequal load distribution and fluctuation of rotation which can be caused by reducing backlash by reducing the size of gaps in the gear meshing portion and in the planet bearing. Therefore, the small backlash planetary gear assembly with large torque capacity can be realized.

Because the carrier in the rear stage of the output member is rotatably supported by the cross roller bearing, a supporting strength of the relevant portion can be enhanced. In addition, since the inner and outer rings of the cross roller bearing are formed integrally with the carrier and the cylindrical assembly housing, respectively, the construction of the bearing portion can be compact and inexpensive.

As set forth above, in the planetary gear assembly according to the present invention, where a resiliently deformable thin wall cylindrical internal gear is employed as the internal gear, tolerance in gear machining and tolerance in assembly can be absorbed by allowing resilient deformation of the internal gear. Accordingly, by the present invention, a planetary gear with a large torque capacity and reduced backlash can be realized.

Although the present invention has been illustrated and described with respect to an exemplary embodiment thereof, it should be understood by those skilled in the art that the foregoing and various other changes, omissions, and additions may be made therein and thereto, without departing from the spirit and scope of the present invention. Therefore, the present invention should not be understood as limited to the specific embodiment set out above but to include all possible embodiments which can be formed within a scope encompassed and equivalents thereof with respect to the features set out in the appended claims.

What is claimed is:

1. A small backlash planetary gear assembly comprising:
an assembly housing;

an internal gear;

a sun gear arranged inside of said internal gear in a concentric fashion, the sun gear assembled in a floating condition with respect to said internal gear;

a plurality of planet gears meshing with said internal gear and said sun gear;

a carrier rotatably supporting said planet gears, wherein the carrier is rotatably supported on an inner peripheral surface of said assembly housing via a cross roller bearing; and said internal gear including an annular boss fixed to said assembly housing, a thin wall annular body portion extending from one axial end of said boss in a cantilever fashion and internal gear teeth formed on an inner peripheral surface of said annular body portion, whereby said thin wall annular body portion absorbs tolerance in assembling and tolerance in gear machining in respective components through resilient deformation.

* * * * *